United States Patent [19]
Gough, Jr.

[11] Patent Number: 5,687,077
[45] Date of Patent: Nov. 11, 1997

[54] METHOD AND APPARATUS FOR ADAPTIVE CONTROL

[75] Inventor: William Albert Gordon Gough, Jr., Aldergrove, Canada

[73] Assignee: Universal Dynamics Limited, Vancouver, Canada

[21] Appl. No.: 548,682

[22] Filed: Oct. 19, 1995

Related U.S. Application Data

[63] Continuation of Ser. No. 283,445, Aug. 1, 1994, abandoned, which is a continuation-in-part of Ser. No. 739,013, Jul. 31, 1991, Pat. No. 5,335,164.

[51] Int. Cl.$^6$ .................................................. G05B 13/04
[52] U.S. Cl. ........................... 364/149; 364/151; 364/164
[58] Field of Search ..................................... 364/148, 149, 364/150, 151, 153, 162, 163, 164

[56] References Cited

U.S. PATENT DOCUMENTS

| | | | |
|---|---|---|---|
| 4,197,576 | 4/1980 | Sanchez | 364/164 |
| 4,639,853 | 1/1987 | Rake et al. | 364/149 |
| 4,641,235 | 2/1987 | Shigemasa et al. | 364/149 |
| 4,663,703 | 5/1987 | Axelby et al. | 364/149 |
| 4,679,136 | 7/1987 | Shigemasa | 364/150 |
| 5,070,458 | 12/1991 | Gilmore et al. | 364/149 |
| 5,115,391 | 5/1992 | Puthenpura et al. | 364/152 |
| 5,402,333 | 3/1995 | Cardner | 364/151 |
| 5,408,405 | 4/1995 | Mozumder et al. | 364/151 |

OTHER PUBLICATIONS

D.W. Clarke and P.J. Gawthrop, Sep. 1975, Self–Tuning Controller, PROC. IEE, vol. 122, No. 9, pp. 929–934.

J. Richalet, A. Rault, J.L. Testud and J. Papon, Model Predictive Heuristic Control: Applications to Industrial Processes, Mar. 29, 1978, Automated, vol. 14, pp. 413–428.

D.W. Clarke, "Introduction to Self–tuning control" in K. Warwick ed. Implementation of Self–tuning Controllers Peter Peregrinus Ltd. London, 1988 (No Month).

*Primary Examiner*—Paul P. Gordon
*Attorney, Agent, or Firm*—Oyen Wiggs Green & Mutala

[57] ABSTRACT

The present invention provides a method and apparatus for adaptive control which does not require a predetermined model of the process to be controlled. The method comprises the steps of 1) setting an initial state vector; 2) setting an initial parameter vector; 3) setting an initial prediction parameter gain between 2 and 10; 4) set the initial covariance matrix; 5) performing a state update 6) estimating the model error; 7) updating the parameter vector, 8) updating the co-variance matrix, and 9) updating the controller output.

8 Claims, 2 Drawing Sheets

METHOD AND APPARATUS FOR ADAPTIVE CONTROL

CROSS-REFERENCE TO RELATED APPLICATIONS

This is a continuation application of application Ser. No. 08/283,445 filed Aug. 1, 1994 now abandoned, which is a continuation-in-part of application No. 07/739,013 filed 31 Jul, 1991 which issued as U.S. Pat. No. 5,335,164 entitled METHOD AND APPARATUS FOR ADAPTIVE CONTROL.

FIELD OF THE INVENTION

The application relates to the field of process control engineering, and more particularly adaptive process control.

BACKGROUND OF THE INVENTION

It is desirable to automate many industrial or other processes for a number of reasons. For example, the automatic control of the piloting of an airplane is desirable to avoid human fatigue and error over long flights. In many industrial processes, such as the operation of a factory, automatic control is preferable to human control since the number of variables and speed of reaction makes human control impractical. In other processes, such as the operation of a household furnace, the use of an automatic control is the only practical solution, since direct human control would be uneconomic.

In all of these control applications, the automatic controller must react to changes in the operating parameters which in turn will require modification of the input parameters. To take the example of a household thermostat, the decrease in temperature of the house (the "process value", y(t)) below a pre-set temperature (the "set point", $y_{SP}$) causes the thermostat to activate the furnace (the "control action" u(t)). The activation of the furnace eventually causes the temperature in the house to rise beyond the pre-set temperature, causing the thermostat to de-activate the furnace.

In more complicated systems, a more complex response of the controller may be required. For example, where the initial error in the system is great or has been present for a long time, the response from the controller may be more drastic than where the initial error is slight or recent in time. Similarly where the error is changing rapidly with time, the response of the controller may be more drastic than if the error is changing slowly. Controllers which are able to react in this way are referred to as Proportional-Integral-Derivative, or PID controllers, and such controllers have dominated industrial controllers to date. These controllers work by examining the instantaneous error between the process value and the set point. The Proportional term causes a larger control action to be taken for a larger error. The Integral term causes a larger control action to be taken if the error has persisted for some time. The Derivative term supplements the control action if the error is changing rapidly with time.

The value of the P-I-D terms depend on characteristics of the process and must be tuned accordingly to yield satisfactory control. Properly tuned PID controllers provide adequate control for a large portion of industrial applications. The basic problem with PID control schemes is that the control action is based on instantaneous error between the process variables and the set point without anticipation of the long term effects of the present control action or of the effects of previous control actions to which the process has not yet responded. For example, a past control action may cause a bump in the process variable which in turn causes a new control action, causing future bumps. This results in cycling due to dead time.

There are many processes with time-variant or non-linear characteristics which are difficult to control with fixed parameter PID controllers. For example, pH control, vibratory feed control and level control in irregular vessels are non-linear, and variable gain systems, mixed reagent control and heat exchanger control are time-variable. Processes which have significant dead-time, such as effluent treatment, furnace temperature control, systems with long pipelines and compressible fluids control also cause problems for PID controllers. To handle these processes, which are often the most critical to the operation of a plant, controllers have evolved to include adaptive features.

Adaptive controllers were first developed in the early 1950's for the avionics industry when difficulties were encountered applying PID controllers to the task of autopiloting aircraft, where it was necessary for the controller to adapt to changes in flight characteristics such as air speed, altitude and aircraft load.

Two basic types of control schemes can be characterized as adaptive. The first are compensator-based controllers. These are based on the automatic tuning of a regulator which compensates for the gain and frequency response characteristics of the process. Self-tuning and gain scheduling PID controllers are examples of compensator-based designs. These designs regulate an error, typically set point minus process value, to generate a control input to the plant which compensates for the plant dynamics so that the process remains stable and can respond to load and set point changes quickly and with minimal overshoot. Gain scheduling involves experimentation to determine optimal PID parameter values under a variety of operating conditions. The PID parameter values are stored and later recalled for use in the controller according to prevailing ambient factors by way of a custom scheduling scheme. Self-tuning PID controllers use a variety of techniques to automatically determine the optimal values for the PID tuning parameters such as the Ultimate Sensitivity method developed by Ziegler and Nichols, the reaction curve method, or mode fitting algorithms. These techniques typically require the introduction of a disturbance and subsequent analysis of the process reaction. Often the disturbance cannot be tolerated while in production or difficulty arises trying to identify the process response due to other load disturbances. Where significant dead-times are present, PID controllers are typically tuned with smaller proportional gain and longer integral action than actually required in order to prevent process cycling at a cost of poor response to load disturbances and setpoint changes.

Process model based adaptive controllers (also called "true" or "polynomial" adaptive controllers) are based on the automatic adjustment of a mathematical model of the process which is used to calculate the actual control action required to obtain a desired process response. Such adaptive controllers are better suited for complex processes with significant dead-times, since the mathematical model can take account of dead-time and consider the effects of past control actions which have not yet appeared in the measurable process variable, and the long term consequences of the control action to be taken. Hereafter, compensator-based controllers will be referred to as self-tuning PID controllers and process model based adaptive controllers will be referred to simply as "adaptive controllers".

Existing adaptive controllers follow the following basic steps:

1. The process model is adjusted to correct for model errors and to respond to changes in process characteristics by fitting observed process responses to the process model.

2. The previous control action and observed process response are incorporated into the model.

3. The plant model is used to predict process response and calculate the required controller output to bring the process variable to the desired set point.

The degree to which the model is able to accurately represent the process determines the efficiency of the control performance. Currently some models are prepared experimentally by compiling details of the plant operation. Such models are extremely plant specific, so the controller based on them is not transferable to different plants. Other adaptive controllers are based on general process models which do not adequately represent the process characteristics. They are difficult to apply and of inconsistent performance.

Problems remain with existing adaptive controllers. Those which function adequately typically require for an adequate process model a detailed knowledge of the plant transfer function, (plant order, time constants, dead time) which is generally obtained experimentally. This adds to the expense of installation and reduces the ability to transfer the controller to other processes. Those controllers of general application do not have process models which accurately represent the process characteristics. There is a also a need for improved adaptive control of industrial processes due to economic pressure and environmental concerns which call for more efficient process control. There is therefore a need for improved adaptive control of industrial processes by adaptive controllers which do not require detailed process analysis of the process to be controlled prior to implementation and which can be used to control a wide variety of processes.

Recently advances have been made in the use of orthonormal functions to model and control plants. C. C. Zervos and G. A. Dumont have outlined in "Deterministic adaptive control based on Laguerre series representation", *International Journal of Control*, 1988, vol. 48, no. 6, p. 2333 (hereinafter "Zervos"), the modelling of the plant by an orthonormal Laguerre network put in state-space form. Although other orthonormal functions such as Legendre functions may be used, Laguerre functions present certain advantages for process control. This article postulates the following predictive control law for calculating the process value y(t) after d future sample points:

$$y(t+d) = y(t) + K^T 1(t) + \beta u(t)$$

where $1(t)$ is the state-space vector such that $y(t) = C^T 1(t)$, $u(t)$ is the system input, T is the sampling period, A is a lower triangular N×N matrix as follows:

$$A = \begin{vmatrix} \tau_1 & 0 & \cdots & 0 \\ \frac{-\tau_1\tau_2 - \tau_3}{T} & \tau_1 & \cdots & 0 \\ \cdot & \cdot & & \cdot \\ \cdot & \cdot & & \cdot \\ \cdot & \cdot & & \cdot \\ \frac{(-1)^{N-1}\tau_2^{N-2}(\tau_1\tau_2 + \tau_3)}{T} & \cdots & \frac{-\tau_1\tau_2 - \tau_3}{T} & \tau_1 \end{vmatrix}$$

$K^T = C^T(A^d - I)$,
$b^T = [\tau_4(-\tau_2/T)\tau_4 \ldots (-\tau_2/T)^{N-1}\tau_4]$ and $\beta = C^T(A^{d-1} + \ldots + I) b$.

Improvements have also recently been made in the use of recursive least squares algorithms for recursive parameter estimation. M. E. Salgado, G. C. Goodwin and R. H. Middleton in "Exponential Forgetting and Resetting", *International Journal of Control*, 1988, Vol. 47, No. 2 p. 477 (hereinafter "Salgado") describe an exponential forgetting and resetting algorithm ("EFRA") suitable for tracking time-varying parameters which performs better than the standard recursive least square algorithm.

SUMMARY OF THE INVENTION

The present invention provides a method and apparatus for adaptive control which does not require a predetermined model of the process to be controlled. The method comprises the steps of 1setting an initial state vector; 2) setting an initial parameter vector; 3) setting an initial prediction parameter gain between 2 and 10; 4) set the initial covariance matrix; 5) performing a state update 6) estimating the model error 7) updating the parameter vector, 8) updating the co-variance matrix, and 9) updating the controller output.

BRIEF DESCRIPTION OF THE DRAWING

In drawings illustrating a preferred embodiment of the invention.

DETAILED DESCRIPTION OF THE PREFERRED EMBODIMENT

The present invention uses a Laguerre function series to describe process dynamics. The orthonormality of the function space provides rapid de-coupling of the filters which facilitates identification of the process dynamics using data fitting techniques. Laguerre functions are ideal for this application due to their simplicity and ability to represent transient signals.

Figure 1:
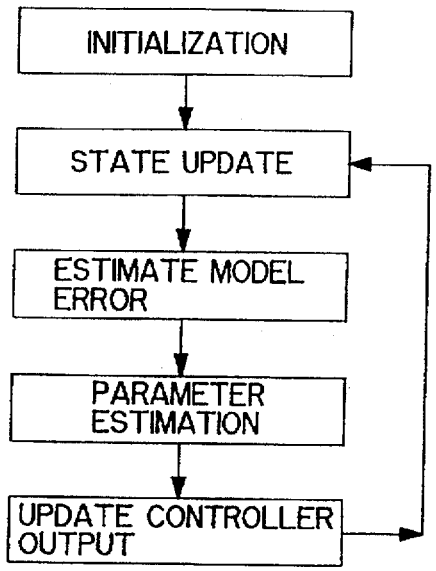
FIG. 1 is a flow chart illustrating the operation of an adaptive controller according to the invention.

As indicated in FIG. 1, the invention involves five basic steps:

1) initialization of the controller;
2) performing a state update;
3) estimating the model error;
4) parameter estimation; and
5) updating the controller output.

Following the last step, the controller returns to the state update step.

1. Initialization

The adaptive controller is initialized by the following steps (bold letters indicate a vector quantity):

a) A state vector $1(t)$ is defined and the initial state vector $1(t)$ is set=

$$\begin{vmatrix} 0 \\ 0 \\ \cdot \\ \cdot \\ 0 \end{vmatrix}$$

b) A parameter vector C(t) is defined and the initial parameter vector C(t) is set=

$$\begin{vmatrix} 1 \\ 0 \\ \cdot \\ \cdot \\ 0 \end{vmatrix}$$

c) The initial prediction parameter gain $\beta$ is user specified, typically 2 to 10.

d) The initial covariance matrix p(t) is set at (10)*I, where I is the identity matrix.

2. The State Update

The state update maps the controller output (u(t)) into Laguerre space so that the effects of past control actions can be taken into account. The velocity form of the controller is used. However the linear form of the controller is also viable. The mathematics for the linear form is the same if the "$\Delta$" is removed in all velocity equations, except as noted below in the Control Update step.

$$\Delta 1(t+1) = A \cdot \Delta 1(t) + b \cdot \Delta u(t)$$

where: $\Delta 1(t)$=state vector b=Laguerre function vector A=Laguerre function matrix u(t)=Controller output and $\Delta u(t)$ is the change in controller output. For feed forward compensation $\Delta u(t)$ is the change in the measured disturbance which is to be fed forward. For stochastics, $\Delta u(t)$ is estimated stochastic error as shown in Zervos. The Laguerre function vector b and Laguerre function matrix A are as defined in Zervos.

3. The Model Error Estimation

The model error ME is calculated as $$\Delta y(t) - C^T_p(t-1)\Delta 1_p(t) - C^T_{FF1}(T-1)\Delta 1_{FF1}(t) - C^T_{FF2}(T-1)\Delta 1_{FF2}(t) - C^T_{FF3}(T-1)\Delta 1_{FF3}(T) = C^T_s(t-1)\Delta 1_s(t)$$

where $C^T_{FF1,2,3}(t-1)$ and $\Delta 1_{FF1,2,3}(t)$ are used to model the effects of measured disturbances (feed forward variables); $C_s(t-1)$ and $\Delta 1_s(t)$ are used to model the effects of unmeasured disturbances (stochastic variables) and $C_p(t-1)$ and $\Delta 1_p(t)$ are used to model the relationship between controller output and process response.

If required, the process signal y(t) (and thus $\Delta y(t)$) is digitally filtered using a second order Butterworth IIR (Infinite Impulse Response) filter to reduce signal noise and to limit the maximum frequency seen by the controller. The design of such filter is well known.

4. The Parameter Estimation

If model error is less than or equal to some arbitrary deadband value, the parameter estimation step is skipped. Statistical methods could also be used to avoid modifying parameter estimates on noise or spurious data. This could include avoiding parameter estimation due to stochastic disturbances by comparing the size of the model error to the predicted model error taking into account the size of the terms n the state vector 1(t) so that the parameter estimation is done only when sufficiently large control actions are made. If either process variable measurement and controller output are not within a reasonable range (e.g. are saturated on a rail), then the parameter estimation step is also skipped.

This step uses an extended Recursive Least Squares and the EFRA version of the Kalman filter (as described in Salgado) to estimate the co-efficients (C(t)) of the state vector 1(t). The U.D. (Upper Diagonal) version of Recursive Least Squares has also been used successfully in this method, although the EFRA method is preferred.

Extended Recursive Least Squares Structure $$c(t) = \begin{vmatrix} C_P(t) \\ C_{FF1}(t) \\ \cdot \\ \cdot \\ C_S(t) \end{vmatrix} \quad 1(t) = \begin{vmatrix} \Delta l_P(t) \\ \Delta l_{FF1}(t) \\ \cdot \\ \cdot \\ \Delta l_S(t) \end{vmatrix}$$

$$(1 \times N) \qquad\qquad (1 \times N)$$

P(t), the covariance matrix is an N×N matrix, where N is the total number of Laguerre functions used in the structure. The EFRA parameter estimation is as follows:

$$C(t) = C(t-1) + \alpha \left[ \frac{P(t-1)l(t)}{1 + l^T(t)P(t-1)l(t)} \right] * [\text{model error}].$$

The EFRA covariance matrix update:

$$P(t) = \frac{P(t-1)}{\lambda} - \alpha \frac{P(t-1)l(t)l^T(t)P(t-1)}{1 + l^T(t)P(t-1)l(t)} + eI - \delta P(t-1)^2$$

$$\lambda = 0.95 \quad \alpha = 0.05 \quad e = 0.005 \quad \delta = 0.005$$

In the presence of significant unmeasured disturbances with low excitation of the parameter estimation, it has been found that the C(t) parameter estimate drifts slowly, and ultimately results in the prediction parameter gain, $\beta$, tending to zero. This causes the controller to become unstable. According to one aspect of the invention, the C(t) vector is periodically reloaded with a reference vector which has been stored during satisfactory controller operation. Reloading is carried out if a steadily decreasing parameter gain is detected. The stored reference vector also is reloaded on start-up or if $\beta$ reaches a specified minimum value. An alternative solution to steadily decreasing parameter gain is to measure the disturbance and incorporate the measurement as a feed forward variable. Another alternative solution is to increase the numerical precision of the calculations.

5. Update Controller Output

The change in controller output necessary to maintain the process at setpoint is calculated as follows:

A. Linear Version:

$$u(t) = [(0.7)(Y_{SP} - y(t)) - K^T(t)l(t)]\beta^{-1}$$

B. Linear Version including stochastic error and feed forward variables:

$$u(t) = [(0.7)(Y_{SP} - y(t)) - K_p^T 1_p(t) - K_s^T 1_s(t) - \gamma 1(t) - K_{FF}^T 1_{FF}(t) - \beta_{FF} FF(t)]\beta_p^{-1}$$

C. Velocity Version:

$$\Delta u(t) = [(0.7)(Y_{SP} - y(t)) - C^T \delta A \Delta 1(t)]\beta^{-1}$$

D. Velocity Version including stochastic error and feed forward variables:

$$\Delta u(t) = [(0.7)(Y_{SP} - y(t)) - C^T_p \delta A \Delta 1_p(t) - C^T_s \delta A \Delta 1_s(t) - \gamma 1(t) -$$

$$C_{FF}{}^T \delta A \Delta 1_{FF}(t) - \beta_{FF} \Delta FF(t)]\beta_p{}^{-1}$$

where 0.7 is an arbitrary reference trajectory $y_{SP}$ is the desired process setpoint and y(t) is the process measurement.

l(t)=estimated stochastic error as shown in Zervos $K^T(t)=C^T(t) (A^\delta-I)$, $\delta$=Prediction Horizon, I=Identity matrix $\delta = (A^{\gamma-1} + A^{\gamma-2} + \ldots + I)$ $\beta$ = Prediction parameter gain
$\quad = C^T(t)(A^{d-1} + A^{d-2} + \ldots + I)b$
$\delta$ = prediction stochastic gain
$\quad = C^T A^{d-1} b - 1$ For the first ten prediction horizons (that is, during initialization), $\beta$ is proxied as follows to limit controller swings:

$\beta(t)=(0.95)\beta(t-1)+(0.05)[C^T(t)(A^{\gamma-1}+A^{\gamma-2}+\ldots+I)b]$

An output limiting scheme is introduced to reduce the impact on process during initialization. Maximum and minimum limits are imposed which open exponentially from initial to final values. The proxy on $\beta$ during initialization effectively provides an additional limit on $\Delta u(t)$ which also is relaxed as $\beta$ approaches a steady state value. For the first 500 iterations the output limits are given by:

MAXIMUM LIMIT(t)=INITIAL MAXIMUM+[FINAL MAXIMUM−INITIAL MAXIMUM]*(1−$e^X$)

MINIMUM LIMIT(t)=INITIAL MINIMUM+[FINAL MINIMUM−INITIAL MINIMUM]*(1−$e^X$)

where X=−[(ITERATION #)*(0.5)/$\delta$]$\delta$=Prediction Horizon The initial and final maximum, minimum limits are chosen to suit the particular application.

The method of the invention also has a controller direction feature which allows it to handle either direct or reverse acting processes. The controller output is normalized 0 to 1, as is the process signal. For a direct acting process (i.e. an increase in controller output causes an increase in the process signal), the controller is implemented as shown above. That is $u(t)^{internal}=u(t-1)^{internal}+\Delta u(t)$ $u(t)^{output}=u(t)^{internal}$ If the process is reverse acting (i.e. an increase in controller output causes a decrease in process signal) the controller has the following changes:

$u(t)^{internal}=u(t-1)^{internal}+\Delta u(t)$ $u(t)^{output}=(1-u(t)^{internal})$.

There is no change to the disclosed controller if the effects of the feed forward variables are direct or reverse. However, if the delay between the feed forward variable measurement and the subsequent measured effect on the process is longer than the delay between a change in controller output u(t) and its subsequent effect on the process, then the $\beta_{FF}1_{FF}(t)$ term should be omitted from the linear version of the control update, and the $\beta_{FF}\Delta 1_{FF}(t)$ term should be omitted from the velocity version of the control update.

The preferred means of carrying out the invention is by means of computer. The method steps are programmed in a suitable language such as "C". Preferably a personal computer which operates on an Intel 386 based processor is used with the input/output from and to the process being controlled operating through a standard PLC (programmable logic controller) or industrial I/O. On such hardware, the control update is carried out at maximum intervals of 1/S the maximum response time of the process, and at minimum intervals which are at least 1 second or ⅟50 the maximum response time, whichever is greater.

EXAMPLE 1

Figure 2:
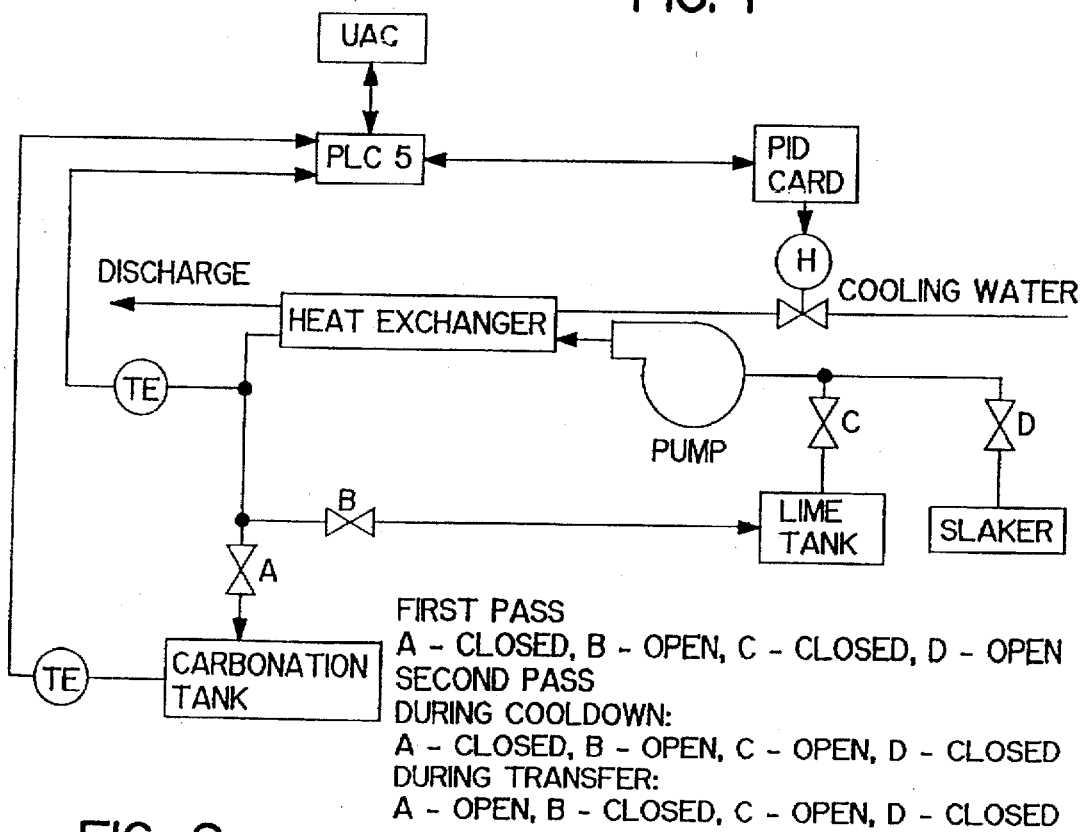
FIG. 2 is a block diagram illustrating the method and apparatus of the invention applied to the control of the line slurry temperature at a Precipitated Calcium Carbonate plant.

The invention was tested on a Precipitated Calcium Carbonate plant. As illustrated in FIG. 2, the process involves the cooling of slaked lime slurry by passing it through a heat exchanger. The cooled lime slurry is finally passed into a carbonation tank where it is mixed with carbon dioxide resulting in the precipitation of the product, calcium carbonate ($CaCO_3$). A deviation of more than 0.2 degrees F. from the desired temperature in the carbonation tank cause undesirable deviations in the physical characteristics of the resulting precipitate. Therefore the slaked lime is cooled in two passes: the first cooling pass is used to step the temperature down closer to the final set point to facilitate greater control on the second pass; the second pass is used to bring the slurry temperature down to the set point.

This loop is difficult to control because there are large gain changes between the two set points, the slurry flow is controlled by the tank head, the cooling water head varies, and the temperature of the cooling water varies from 32 to 80 degrees F. Previously, the loop was controlled by a PLC PID card. Due to the differences in gain between the high and low set points, different sets of tuning parameters were required for the second pass. During the second pass the temperature of the cooling water is close to the lime slurry temperature, producing a long process response time which causes difficulty for the PID controller, resulting in oscillatory behaviour at the lower set point.

A controller according to the invention was installed, designated UAC in FIG. 2. The invention was able to adapt to the gain changes between set points with little difficulty, resulting in minimal temperature offset at the end of the second pass. This was a Single Input Single Output controller. The controller was operated on a IBM-compatible XT-type DOS-based processor with an operating speed of 8 Mhz and 640k RAM. The scan period was 10 seconds. The I/O device was an Allen-Bradley PLC 2/30. Twelve primary filters and three stochastic filters were used. The update period was every 40 seconds.

EXAMPLE 2

Figure 3:
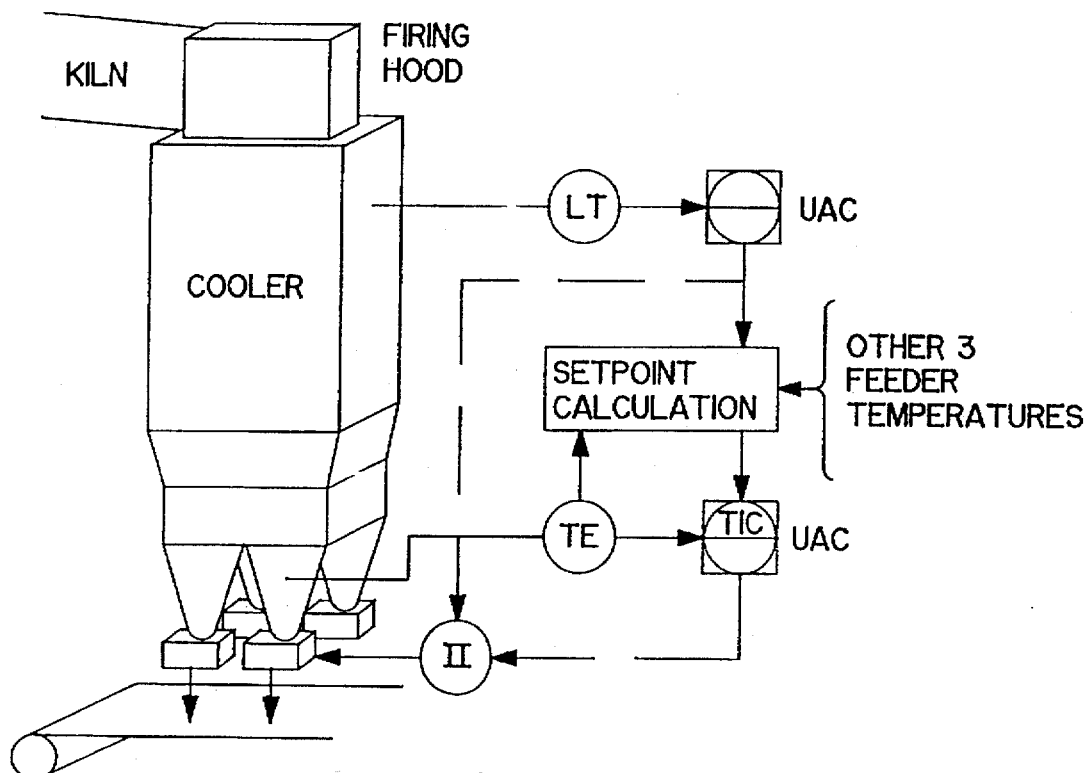
FIG. 3 is a schematic diagram illustrating a single feeder control for application of the method and apparatus of the invention to control of a lime kiln cooler.

The invention was also tested in an application at a rotary lime kiln, as illustrated in FIG. 3. The goal of this application is to control the level of lime in a cooler at the discharge end of a kiln, while maintaining an even temperature distribution in the cooler. Four vibratory feeders located in the bottom of the cooler are adjusted to control the level and temperature distribution of the lime in the cooler. It is important to have stable level/ temperature control to ensure product consistency and to stabilize temperatures in the firing hood and kiln. The process is difficult to control because the process dead-time between changes in the feeder rate and discharge temperature at the feeder varies from 45 to 90 minutes, making PID control impossible. Also the fact that the final control element (the feeder) is a vibrating trough and the interaction of the four feeders makes control difficult.

Prior to installation of the invention, the cooler level was controlled using a single PID controller to regulate all four feeders. Temperature control in each feeder was performed manually using a trim signal added to the output of the cooler level controller. Level control was satisfactory but temperature control was poor.

The controller of the invention was installed to control the cooler level and four additional controllers according to the invention were installed to automatically provide a trim signal to stabilize the temperatures in the four feeders. The invention reduced the cooler feeder temperature deviations from 200 degrees C. to about 30 degrees C. Stabilized cooler conditions have improved the product quality and enabled the kiln to produce lime with a more consistent slaking rate. The processor used for this application of the invention was a Compaq 386 using the OS/2 operating system and operating at 20 Mhz, with 6MB RAM. The scan period was 2 seconds. The I/O device was an Allen-Bradley PLC 5/25. Eight primary filters and no stochastic filters were used. The update period was every 120 seconds.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of generating a control signal for controlling a process, during each of a plurality of sampling instants, said process having at least one input variable and one output variable, the application of said control signal to said process constituting a control action causing a variation of said input variable, said method comprising:

a) providing an adaptive controller adapted to store a model of said process comprising a state vector and a model parameter vector and to generate said control action;

b) providing means for measuring said output variable of said process, generating a signal representing said measurement and communicating said measurement to said adaptive controller;

c) selecting a number n of orthonormal series functions to model said process;

d) providing a signal to define an initial state vector $1(t)_{t=0}=$ $$\begin{vmatrix} d_1 \\ d_2 \\ \cdot \\ \cdot \\ \cdot \\ d_n \end{vmatrix}$$

where $d_1$ is a constant, and storing said initial state vector in said adaptive controller;

e) providing a signal to define an initial predicted model parameter vector=

$$\begin{vmatrix} h_1 \\ h_2 \\ \cdot \\ \cdot \\ \cdot \\ h_n \end{vmatrix}$$

where $h_1$ is a constant, and storing said initial predicted model parameter vector in said adaptive controller;

f) performing an update of said state vector in said controller using said orthonormal series functions to provide a history of said control actions and any feedforward input variables up to that sampling instant;

g) measuring said process output variable and calculating a model error in the predicted model parameter vector by comparing said predicted model parameter vector to said measured process output variable;

h) updating the model parameter vector with said model error by a Kalman filter recursive least squares method;

i) calculating the change in controller output required to bring said process output variables to a desired value based on a predicted process output variable obtained from said updated model parameter vector and said updated state vector;

j) generating a control action based on said calculated required change in controller output;

k) repeating steps f) through j) at each sampling instant;

l) storing a reference model parameter vector in said controller during a period of satisfactory controller operation; and m) periodically replacing said model parameter vector in said controller with said reference vector if a steadily decreasing prediction parameter gain is detected where said change in controller output $\Delta u(t)$ is calculated generally as follows:

$$\Delta u(t) = [(h)\ (Y_{SP} - y(t) - C_P TS_A \Delta l_P(t) - C_{FF1} TS_A \Delta l_{FF1}(t) -$$

$$C_{FF2} TS_A \Delta l_{FF2}(t) - C_{FF3} TS_A \Delta l_{FF3}(t) - C_S TS_A \Delta l_S(t) -$$

$$\beta_{FF1}(t)\Delta FF_1(t) - \beta_{FF2}(t)\Delta FF_2(t) - \beta_{FF3}(t)\Delta FF_3(t) - \beta_S(t)\Delta \hat{l}(t)]\beta_P^{-1}(t)$$

where (h) is a constant $Y_{SP}$ is the set point y(t) is the process value at time t $\delta = (A^{\gamma-1} + \ldots + I)$ $\beta_P(t) = C_P^T(t)[A^{\gamma-1} + A^{\delta-2} + \ldots I]b$ $\beta_{FFx}(t) = C_{FFx}^T(t)\ [A^{\gamma-1} + A^{\delta-2} + \ldots I]b$ $\beta_S(t) = C_S^T(t)[A^{\delta-1}]b-1$ $\Delta FF_x(t) = FF_x(t) - FF_x(t-1)$ $\hat{l}(t)$=proxied stochastic error=$(0.5)\hat{l}(t-1)+(0.5)$ (estimated error(t), $\Delta l_s(t) = A\Delta l_s(t-1) + b\hat{l}(t)$.

2. The method of claim 1 wherein, when the delay between a measured change in the feedforward variable and the effect on the measured process variable is longer than the delay between a change in controller output and its effect, the $\beta_{FF}\Delta_{FF}(t)$ terms are omitted from the calculation of change in controller output.

3. The method of claim 1 wherein the initial state vector $1(t)=$ $$\begin{vmatrix} 0 \\ 0 \\ \cdot \\ \cdot \\ 0 \end{vmatrix}$$

4. The method of claim 1 wherein the initial predicted model parameter vector=

$$\begin{vmatrix} 1 \\ 0 \\ \cdot \\ \cdot \\ \cdot \\ 0 \end{vmatrix}$$

5. The method of claim 1 wherein the initial prediction parameter gain is set between 2 and 10.

6. The method of claim 1 wherein the initial covariance matrix P(t) for use in updating said model parameter vector is set at (10)*I, where I is the identity matrix.

7. The method of claim 1 wherein the recursive least squares parameter estimation is an EFRA parameter estimation.

8. The method of claim 1 wherein said orthonormal series functions are Laguerre functions.

* * * * *